United States Patent [19]

Andersson et al.

[11] 4,027,699
[45] June 7, 1977

[54] FLUID DISTRIBUTION VALVE

[75] Inventors: Leif Andersson; Ritindar Singh, both of Finspong, Sweden

[73] Assignee: Stal-Laval Turbin AB, Finspong, Sweden

[22] Filed: Sept. 29, 1975

[21] Appl. No.: 617,558

[30] Foreign Application Priority Data

Oct. 2, 1974 Sweden .......................... 7412379

[52] U.S. Cl. ...................... 137/625.37; 137/625.48
[51] Int. Cl.² ........................................ F16K 11/07
[58] Field of Search .......... 137/625.3, 609, 625.18, 137/625.48, 625.29, 625.34, 625.37

[56] References Cited

UNITED STATES PATENTS

| | | | |
|---|---|---|---|
| 752,610 | 2/1904 | Wilkinson | 137/609 X |
| 3,472,281 | 10/1969 | Chiba et al. | 251/205 X |
| 3,853,146 | 12/1974 | Blair | 137/625.3 |

*Primary Examiner*—Arnold Rosenthal
*Attorney, Agent, or Firm*—Pollock, Vande Sande & Priddy

[57] ABSTRACT

A fluid distribution valve includes a single inlet and a plurality of parallel outlets for connection to a plurality of fluid demand locations. Plural valve elements prevent large flows to the outlets in a first position of the valve while throttle by-passages around the valve elements allow small, usually equal flows to all demand locations in the first position. In a second position, the valve elements permit flow to the parallel outlets in proportion to the flow resistance at the demand locations.

4 Claims, 3 Drawing Figures

FLUID DISTRIBUTION VALVE

BACKGROUND OF THE INVENTION

In the fluid flow control arts, numerous applications are known wherein fluid flow demand is relatively small and essentially equal at a plurality of fluid demand locations during some phases of operation, but is much larger and possibly unevenly distributed during other phases of operation. For example, in the fuel supply system for the combustion chamber of a gas turbine, the fuel nozzles or throttles frequently require small, normally equal fuel flows when the device is starting up. Due to the different elevations of the nozzles, the unequal flow resistances of the conduits leading to the nozzles, and related factors familiar to those in the art, equalization of flow at all nozzles in the startup regime can be difficult to achieve. Conversely, once the turbine has reached its operating speed, the fuel nozzles or throttles usually must provide larger fuel flows which may differ from nozzle to nozzle depending on nozzle location in the turbine. Where a large number of fuel nozzles is used, fuel systems having individually adjustable nozzles become quite complex; thus, a need has been felt for simple fuel flow control devices for these types of applications.

OBJECTS OF THE INVENTION

An object of the invention is to provide a fluid distribution valve for metering small flows to a plurality of demand locations in one position of the valve; and large flows, in a second position of the valve.

Another object of the invention is to provide such a valve in which the small, metered flows are essentially equal and above all independent of the back pressures at the demand locations in the one position; yet, the large flows may vary from one demand location to another in the second position.

A further object of the invention is to provide such a valve in which the large flow at each demand location has a constant but not necessarily equal relationship or ratio to the large flow at each of the remaining demand locations, regardless of the total flow rate through the valve.

These objects of the invention are given only by way of example; thus, other desirable objects and advantages inherently achieved by the invention may be apparent to those skilled in the art. Nonetheless, the scope of the invention is to be determined only by reference to the appended claims.

SUMMARY OF THE INVENTION

The above objects and other advantages are achieved by the fluid distribution valve according to the invention which comprises in one embodiment a valve body having an inlet for connection to a source of fluid and a plurality of outlets for connection to a plurality of fluid demand locations. A plurality of movable valve elements is located within the body and these are selectively positionable simultaneously to open and close the major paths of fluid communication between the inlet and outlets. Small throttle by-passes are provided for respectively connecting each of the outlets to the inlet when the valve elements are in their closed position.

Where the fluid demand locations include throttling means, the throttle by-passes suitably are sized so that equal flow is obtained at all demand locations when the valve elements are in their closed position. Preferably, the area of the throttle by-passes is smaller than the area of the throttling means at the fluid demand locations.

DETAILED DESCRIPTION OF THE PREFERRED EMBODIMENTS

Figure 1:
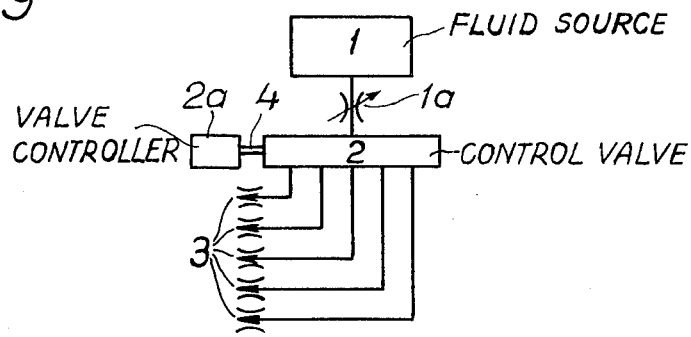
FIG. 1 shows a schematic diagram of a fluid distribution system embodying a control valve according to the invention.

There follows a detailed description of the invention, reference being made to the drawing, in which like reference numerals identify like elements of structure in each of the several Figures.

FIG. 1 shows schematically a fluid distribution system embodying a control or fluid distribution valve according to the present invention. A fluid source 1, such as a fuel pump, is connected to a control valve 2 via an intermediate variable orifice valve 1a. Control valve 2 is connected in-turn to a plurality of outlet lines leading to a plurality of fluid demand locations, such as fuel nozzles 3. A valve controller 2a is used to actuate control valve 2 to regulate the fluid flow to the demand locations.

In some applications, such as in a gas turbine, fuel nozzles 3 will be located at varying distances from control valve 2 and at varying heights relative to each other. Moreover, nozzles 3 may be sized by design to be capable of delivering different flow rates to the turbine combustion chamber for a given fuel pressure. Where it is desired to equalize the flow through all nozzles 3 under some operating conditions, control valve 2 must adjust the flow rates to achieve this result.

Figure 2:
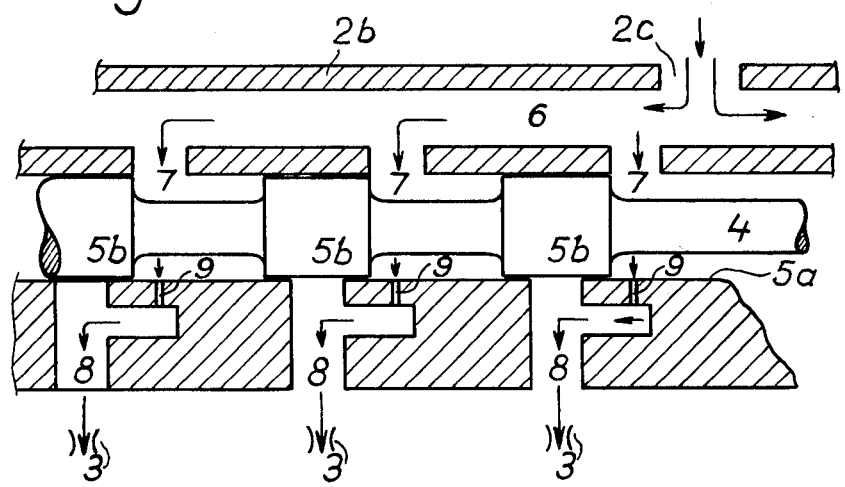
FIG. 2 shows a schematic, partially sectional view of the control valve according to the invention, in its closed position.

FIG. 2 shows a schematic, partially sectional view of control valve 2. A valve body 2b is provided which includes an inlet 2c for admitting fluid from source 1. Within valve body 2b, a bore 5a slidably receives a valve spool 4 having a plurality of interconnected valve elements or pistons 5b. Spool 4 is connected to valve controller 2a. As fluid enters valve body 2b, it passes through an inlet plenum or manifold chamber 6. From plenum 6, the fluid passes through a plurality of parallel openings 7 which are always open to direct fluid to the spaces between pistons 5b. In the illustrated, closed position, each piston 5b closes one of a plurality of outlet ports 8, each of which is connected by an outlet line to one of the fluid demand locations, such as fuel nozzles 3. Ports 8 are usually larger than nozzles 3.

A plurality of throttle by-passes 9 is provided in valve body 2b to connect outlet ports 8 to openings 7 while the valve is in its illustrated position. By-passes 9 are much smaller than outlets 8. Throttle by-passes 9 are individually sized to account for differences in the size and elevation of nozzles 3 and similar boundary conditions, or they are all equal so that equal flows are obtained at nozzles 3 when the valve is in the illustrated, closed position. Of course, by-passes 9 could be sized to provide other flow distributions, if desired. Usually, by-passes 9 will be smaller than nozzles 3. As the magnitude of the total flow increases, nozzles 3 will see larger, but still essentially equal flows.

When the variable orifice valve 1a has been opened sufficiently to establish the desired flow through by-passes 9 in the closed position, spool 4 may then be shifted to the left to connect inlet openings 7 via a plurality of large flow communication paths directly to outlet ports 8. In the case of a gas turbine, the desired start up flow usually has been achieved when the pressure drops across fuel nozzles 3 considerably exceed the differences in the back pressures of the nozzles 3 caused by their different elevations. The shifting of spool 4 should be made quickly enough to avoid temporary uncontrolled throttling as pistons 5b open outlet ports 8, but not so quickly as to exceed the capacity of variable orifice valve 1a to compensate for pressure losses when by-passes 9 are short-circuited. Thus, valve controller 2a is chosen to be of the ON-OFF type so that outlet ports are either fully opened or fully closed. Hydraulic actuators of the familiar type are suitable.

Figure 3:
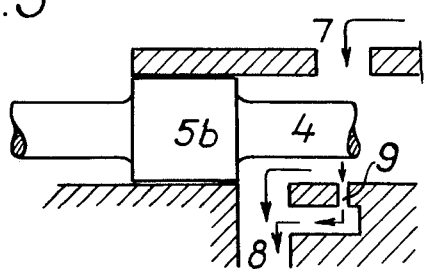
FIG. 3 shows a schematic, fragmentary view of the control valve according to the invention, in its open position.

FIG. 3 shows the position of spool 4 when valve 2 has been shifted to the open position. In this case, virtually all of the flow will pass directly into outlet ports 8, with very small flow through by-passes 9. So, the total flow through the control valve will then distribute or apportion itself in accordance with the flow resistances of each of the parallel fuel nozzles 3. As the magnitude of the total flow increases, this flow distribution will be maintained.

In the embodiment of the invention illustrated in FIGS. 2 and 3, by-passes 9 are positioned so that they remain open at all times; however, it is within the scope of the present invention to locate by-passes 9 so that they are closed by pistons 5 when spool 4 is shifted to the left. In such a case, however, outlets 8 should be well-opened before by-passes 9 are closed by pistons 5b, in order to minimize uncontrolled throttling past the pistons. It is also within the scope of the invention to provide a three-position valve controller and to locate by-passes 9 so that both the outlet ports 8 and the by-passes 9 are closed in the first, right-hand position of spool 4. As the spool moves left to a second position, by-passes 9 would open; and as it moves left to a third position, both the outlet ports 8 and the by-passes 9 would be open. Finally, by-passes 9 could be located in pistons 5 themselves, without departing from the scope of the invention. For example, a passage or passages could be provided through the body of each piston 5 or the lips of the pistons could be notched or grooved to provide the desired by-passes.

Having described our invention in sufficient detail to enable those skilled in the art to make and use it,

We claim:

1. A fluid distribution valve for controlling fluid flow from a fluid source to a plurality of parallel fluid demand locations, comprising:

valve body means having at least one inlet for connection to said source and a corresponding plurality of parallel outlets, each of said parallel outlets being adapted for connection to one of said plurality of parallel fluid demand locations;

a corresponding plurality of valve elements selectively positionable within said valve body means to simultaneously open or close a corresponding plurality of parallel, large-flow fluid communication paths through said valve body between said at least one inlet and each of said plurality of parallel outlets; and a corresponding plurality of parallel throttle by-passes located in said valve body, each one of said plurality of parallel throttle by-passes respectively connecting a corresponding one of said plurality of parallel outlets to said at least one inlet when said large flow communication paths are closed by said plurality of parallel valve elements;

whereby a maximum fluid flow is established to said plurality of parallel demand locations when said valve elements are in their open position; and a minimum flow, when said valve elements are in their closed position.

2. A valve according to claim 1, wherein each of said demand locations includes throttling means, said plurality of throttle by-passes being sized corresponding to a certain fluid flow distribution between said demand locations when said valve elements are in their closed position.

3. A valve according to claim 1, wherein said valve body means comprises a cylinder bore, said inlet, said outlets and said by-passes communicating therewith; and said valve elements comprise piston means interconnected for simultaneous movement in said bore, said piston means being spaced to close said outlets in said closed position, while leaving said by-passes open; and to open said outlets in said open position.

4. A valve according to claim 2, wherein the areas of said throttling by-passes are smaller than the area of said throttling means.

* * * * *